US012645407B2

(12) United States Patent
   Sato

(10) Patent No.: US 12,645,407 B2
(45) Date of Patent: Jun. 2, 2026

(54) INFORMATION PROCESSING DEVICE AND INFORMATION PROCESSING PROGRAM INVOLVING PROVIDING AN INFORMATION PROCESSING DEVICE AND A PROGRAM CAPABLE OF SETTING A TIME WHEN SETTING INFORMATION SET IN ADVANCE FOR A FUNCTION IS MADE AVAILABLE

(71) Applicant: FUJIFILM CORPORATION, Tokyo (JP)

(72) Inventor: Eri Sato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 455 days.

(21) Appl. No.: 18/263,709

(22) PCT Filed: Jan. 27, 2022

(86) PCT No.: PCT/JP2022/003171
   § 371 (c)(1),
   (2) Date: Aug. 1, 2023

(87) PCT Pub. No.: WO2022/176562
   PCT Pub. Date: Aug. 25, 2022

(65) Prior Publication Data
   US 2024/0086245 A1    Mar. 14, 2024

(30) Foreign Application Priority Data
   Feb. 18, 2021   (JP) ................................. 2021-024529

(51) Int. Cl.
   *G06F 3/12*       (2006.01)
   *G06F 9/50*       (2006.01)
   *H04N 1/00*       (2006.01)

(52) U.S. Cl.
   CPC .......... *G06F 3/1204* (2013.01); *G06F 3/1257* (2013.01); *G06F 3/1258* (2013.01); *G06F 9/5038* (2013.01); *H04N 1/00* (2013.01)

(58) Field of Classification Search
   None
   See application file for complete search history.

(56) References Cited

U.S. PATENT DOCUMENTS 5,902,352 A * 5/1999 Chou .................... G06F 9/4881
                                                                718/100
2003/0208607 A1* 11/2003 Yamazaki ............... G06F 3/126
                                                                709/229

(Continued)

FOREIGN PATENT DOCUMENTS

JP          6341218 B      6/2018

*Primary Examiner* — Miya J Cato
(74) *Attorney, Agent, or Firm* — SOLARIS Intellectual Property Group, PLLC

(57)        ABSTRACT

An information processing unit is provided with a CPU. The CPU causes a display unit to display an operator with which setting information that can be reflected in a job being an instruction to execute a function is associated, and on which remaining setting for causing the operator to remain on the display unit is performed. The CPU sets one or more pieces of time point information for determining the available time of the operator by user operation. When the user selects the operator during the available time, the CPU makes the job executable while reflecting the setting information associated with the operator therein.

10 Claims, 8 Drawing Sheets

(56)                    References Cited

U.S. PATENT DOCUMENTS

| | | | |
|---|---|---|---|
| 2003/0214657 A1* | 11/2003 | Stringham | H04L 69/329 |
| | | | 358/1.15 |
| 2017/0208181 A1* | 7/2017 | Kim | H04N 1/0023 |
| 2018/0300463 A1* | 10/2018 | Takeo | G06F 3/1238 |
| 2022/0075569 A1* | 3/2022 | Kakutani | G06F 3/1286 |
| 2022/0263971 A1* | 8/2022 | Reyes | G06N 3/04 |

* cited by examiner

| FUNCTIONS | SETTING INFORMATION | | | REMAINING SETTINGS | TIME POINT INFORMATION | | |
|---|---|---|---|---|---|---|---|
| | COLOR | DOUBLE SIDED | . . | | START DATE AND TIME | END DATE AND TIME | SWITCHING DATE AND TIME |
| PRINTING | COLOR | DOUBLE SIDED | . . | REMAINING | MM:DD:hh:mm | MM:DD:hh:mm | --- |
| PRINTING | BLACK-AND-WHITE | DOUBLE SIDED | . . | REMAINING | MM:DD:hh:mm | --- | --- |
| PRINTING | COLOR | SINGLE SIDED | . . | REMAINING | --- | --- | MM:DD:hh:mm |
| . . | | . . | | . . | | . . | |

Figure 3:
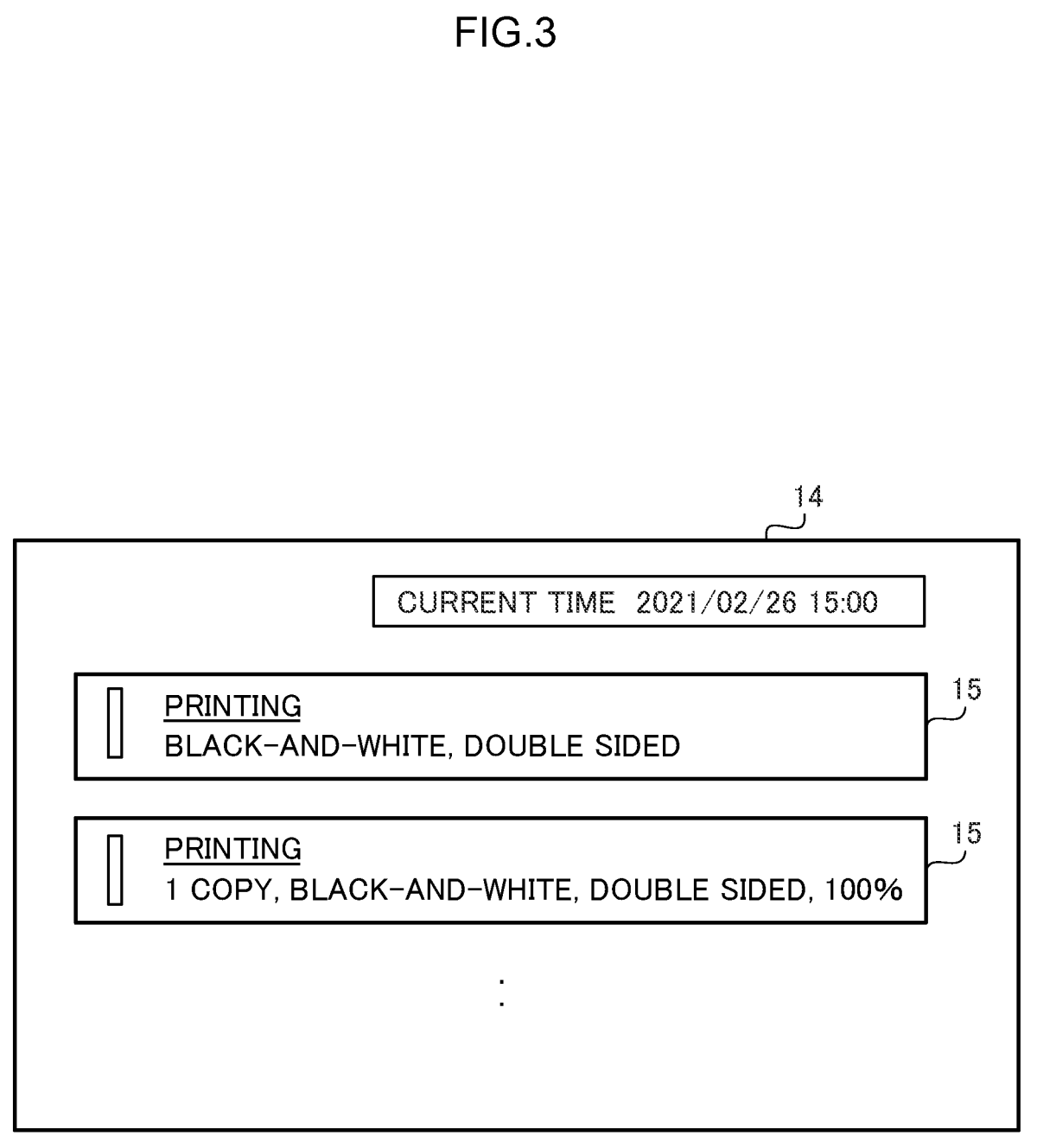

CURRENT TIME  2021/02/26 15:00

⬚ <u>PRINTING</u>
BLACK-AND-WHITE, DOUBLE SIDED                    15

⬚ <u>PRINTING</u>
1 COPY, BLACK-AND-WHITE, DOUBLE SIDED, 100%      15

:

INFORMATION PROCESSING DEVICE AND INFORMATION PROCESSING PROGRAM INVOLVING PROVIDING AN INFORMATION PROCESSING DEVICE AND A PROGRAM CAPABLE OF SETTING A TIME WHEN SETTING INFORMATION SET IN ADVANCE FOR A FUNCTION IS MADE AVAILABLE

TECHNICAL FIELD

The present disclosure relates to an information processing device and an information processing program.

BACKGROUND ART

Japanese Patent Publication (JP-B2) No. 6341218 discloses an image processing device. The image processing device includes a display means that displays various types of information, and a history recording means that records a job execution history in history information each time a job designated by a user is executed. Furthermore, the image processing device also includes a button management means that manages a setting reflection button in association with display target information and display date and time information. The button management means generates a setting reflection button for reflecting the setting information of the job on the basis of the history information, and generates the display target information defining a display target user of the setting reflection button and the display date and time information defining a display date and time of the setting reflection button. Furthermore, the image processing device includes a display control means that causes the display means to display the setting reflection button. The display by the display control means is performed in a case where when a user is authenticated to shift to a login state, the login user is the user defined by the display target information and a login date and time is the display date and time defined by the display date and time information.

SUMMARY OF INVENTION

Technical Problem

In a user interface for executing a function of an application, setting information set at the time of executing the function can be set in advance in an operator.

However, since the time when the setting information is required varies depending on the business, it is desired to use the operator at the required time.

An object of the present disclosure is to provide an information processing device and a program capable of setting a time when setting information set in advance for a function is made available.

Solution to Problem

An information processing device according to a first aspect of the disclosure includes a processor, in which the processor displays, on a display unit, an operator associated with setting information that can be reflected in a job that is an instruction to execute a function, the operator being set to remain on the display unit, sets one or more pieces of time point information for determining an available time of the operator by an operation of a user, and makes the job executable by reflecting the setting information associated with the operator when the user selects the operator in the available time.

An information processing device according to a second aspect of the disclosure is the information processing device according to the first aspect of the disclosure, in which the processor sets a start date and time as the time point information, and makes the operator available after the start date and time.

An information processing device according to a third aspect of the disclosure is the information processing device according to the second aspect of the disclosure, in which the processor causes the display unit to display the operator that is unavailable for a predetermined period before the start date and time together with an advance notice of the start date and time.

An information processing device according to a fourth aspect of the disclosure is the information processing device according to any one of the first to third aspects of the disclosure, in which the processor sets an end date and time as the time point information, and causes the display unit to display the operator and makes the operator available, until the end date and time.

An information processing device according to a fifth aspect of the disclosure is the information processing device according to the fourth aspect of the disclosure, in which the processor causes the display unit to display a display mode indicating approach of the end date and time, during a predetermined period before the end date and time.

An information processing device according to a sixth aspect of the disclosure is the information processing device according to the first aspect of the disclosure, in which the operator is associated with first setting information and second setting information different from the first setting information, and the processor sets a switching date and time as the time point information, and changes the setting information reflected in the job by selecting the operator from the first setting information to the second setting information at the switching date and time.

An information processing device according to a seventh aspect of the disclosure is the information processing device according to the sixth aspect of the disclosure, in which the processor causes the display unit to display the operator together with an advance notice of the switching date and time during a predetermined period before the switching date and time.

An information processing device according to an eighth aspect of the disclosure is the information processing device according to any one of the first to seventh aspects of the disclosure, in which the processor causes the operator to which the time point information has been set to be displayed in a display mode different from a display mode of the operator to which the time point information has not been set.

An information processing device according to a ninth aspect of the disclosure is the information processing device according to any one of the first to seventh aspects of the disclosure, in which in a management mode switched on the display unit according to an operation of the user, the processor causes the operator including the operator that is not in the available time to be displayed, and makes the setting information editable.

An information processing device according to a tenth aspect of the disclosure is the information processing device according to the ninth aspect of the disclosure, in which in the management mode, in a case in which the user is a creator of the operator, the processor causes the operator created by the creator to be displayed, and in a case in which the user is an administrator, the processor displays the operator created for all users, and enables search under a predetermined condition.

An information processing program according to an eleventh aspect of the disclosure causes a computer to execute processing of: displaying, on a display unit, an operator associated with setting information that can be reflected in a job that is an instruction to execute a function, the operator being set to remain on the display unit; setting one or more pieces of time point information for determining an available time of the operator by an operation of a user; and making the job executable by reflecting the setting information associated with the operator when the user selects the operator in the available time.

Advantageous Effects of Invention

According to the first aspect and the eleventh aspect of the disclosure, it is possible to set a time when setting information set in advance for a function is made available.

According to the second aspect of the disclosure, the operator can be used from the set start date and time.

According to the third aspect of the disclosure, the user can identify the date and time when the use of the operator is started.

According to the fourth aspect of the disclosure, the operator can be used until the set end date and time.

According to the fifth aspect of the disclosure, the user can identify the date and time when the use of the operator is ended.

According to the sixth aspect of the disclosure, the setting information can be switched at the switching date and time.

According to the seventh aspect of the disclosure, the user can identify the switching date and time.

According to the eighth aspect of the disclosure, the user can identify the operator whose time point is determined.

According to the ninth aspect of the disclosure, the user can edit the setting information in the management mode.

According to the tenth aspect of the disclosure, display according to the user can be performed in the management mode.

BRIEF DESCRIPTION OF DRAWINGS

FIG. 2 is a diagram for explaining information stored in an information storage unit according to the embodiment.

FIG. 3 is a diagram illustrating a screen in which operators that are job execution histories of a certain user are listed on a display unit.

DESCRIPTION OF EMBODIMENTS

Figure 1:
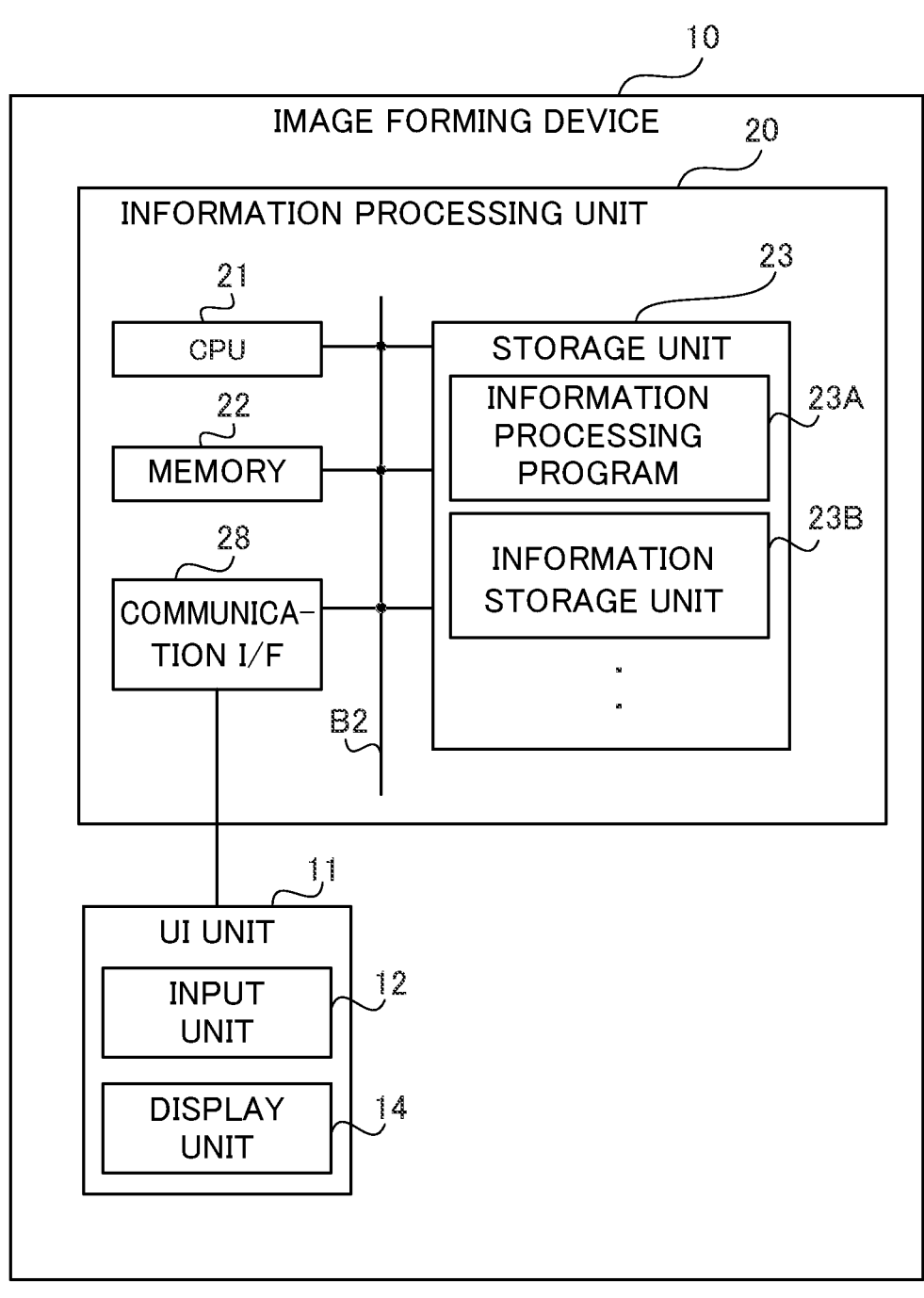
FIG. 1 is a schematic diagram illustrating an example of a hardware configuration of an image forming device according to an embodiment.

Hereinafter, an example of an embodiment (hereinafter, the present embodiment) of the disclosure will be described with reference to the drawings. Note that, in the drawings, the same or equivalent components and portions are denoted by the same reference signs. Furthermore, dimensional ratios in the drawings are exaggerated for convenience of description, and may be different from actual ratios.

A hardware configuration of an image forming device 10 according to the present embodiment will be described with reference to FIG. 1. In the present embodiment, a digital multifunction machine having an image printing function, an image reading function, an image transmission function, and the like is applied as the image forming device 10. Furthermore, an image forming device having one or two of these functions may be applied as the image forming device 10.

As illustrated in FIG. 1, the image forming device 10 includes a user interface (UI) unit 11 and an information processing unit 20. Note that the UI unit 11 and the information processing unit 20 may be configured separately from the image forming device 10. Furthermore, the image forming device 10 according to the present embodiment is provided with an image forming unit, a sheet feeding unit that supplies a recording sheet, and the like as main configurations, but these configurations are not a main configuration of the disclosure, and thus the description thereof will be omitted here.

Next, a hardware configuration of the UI unit 11 according to the present embodiment will be described. The UI unit 11 according to the present embodiment includes an input unit 12 and a display unit 14.

The input unit 12 includes a pointing device such as a mouse, and a keyboard, and is used to receive various input information.

The display unit 14 is, for example, a liquid crystal display, and displays various types of information. The display unit 14 may function as the input unit 12 by adopting a touch panel system.

Next, a hardware configuration of the information processing unit 20 according to the present embodiment will be described. In the present embodiment, an information processing device such as a computer or a server may be applied as the information processing unit 20. The information processing unit 20 according to the present embodiment includes a CPU 21, a memory 22 as a temporary storage area, a nonvolatile storage unit 23, and a communication interface (I/F) 28. The respective configurations are connected to each other via a bus B2.

The storage unit 23 is realized by a storage device such as an HDD, an SSD, or a flash memory. Note that the storage unit 23 as a storage medium stores an information processing program 23A. The CPU 21 reads the information processing program 23A from the storage unit 23, develops the information processing program in the memory 22, and sequentially executes the processes included in the information processing program 23A. Furthermore, in the storage unit 23, various types of information that need to be stored are stored in an information storage unit 23B or the like.

The communication I/F 28 is an interface for the information processing unit 20 to communicate with the UI unit 11. For the communication, for example, a wired communication standard such as Ethernet (registered trademark) or FDDI is used.

Next, information stored in the information storage unit 23B according to the present embodiment will be described with reference to FIG. 2. As illustrated in FIG. 2, the information storage unit 23B stores functions, setting information, remaining settings, and time point information in association with each other. Note that information in each row of the information storage unit 23B is associated with an operator 15 to be described later.

The functions are information indicating functions that can be executed by the image forming device 10. As the functions, a printing function, an image reading function, an image transmission function, and the like are applied. Each of the functions is executed by a job that is an instruction to execute the function. In the job, the setting information related to the function can be reflected.

The setting information is information indicating a setting corresponding to the function. In the present embodiment, color or black-and-white print setting, double-sided or single-sided print setting, copy setting, and magnification setting are applied as the above settings. However, as the setting, a margin size setting may be applied, or a single or a combination of a plurality of these settings may be applied.

FIG. 3 is a screen displaying, on the display unit 14, an operator 15 which is an execution history of a job of a certain user in a list. The CPU 21 causes the display unit 14 to display the operator 15. As illustrated in FIG. 3, the content of the setting information at the time of job execution is stored as a history in units of users, and can be displayed as the operator 15. In the information processing unit 20, by selecting the operator 15 from the display unit 14, the setting information is reflected in the job and the job is or can be executed. Note that a specific setting method of the setting information can be implemented by various designs that are generally applicable in the image forming device 10, and thus, description thereof is omitted.

Figure 4:
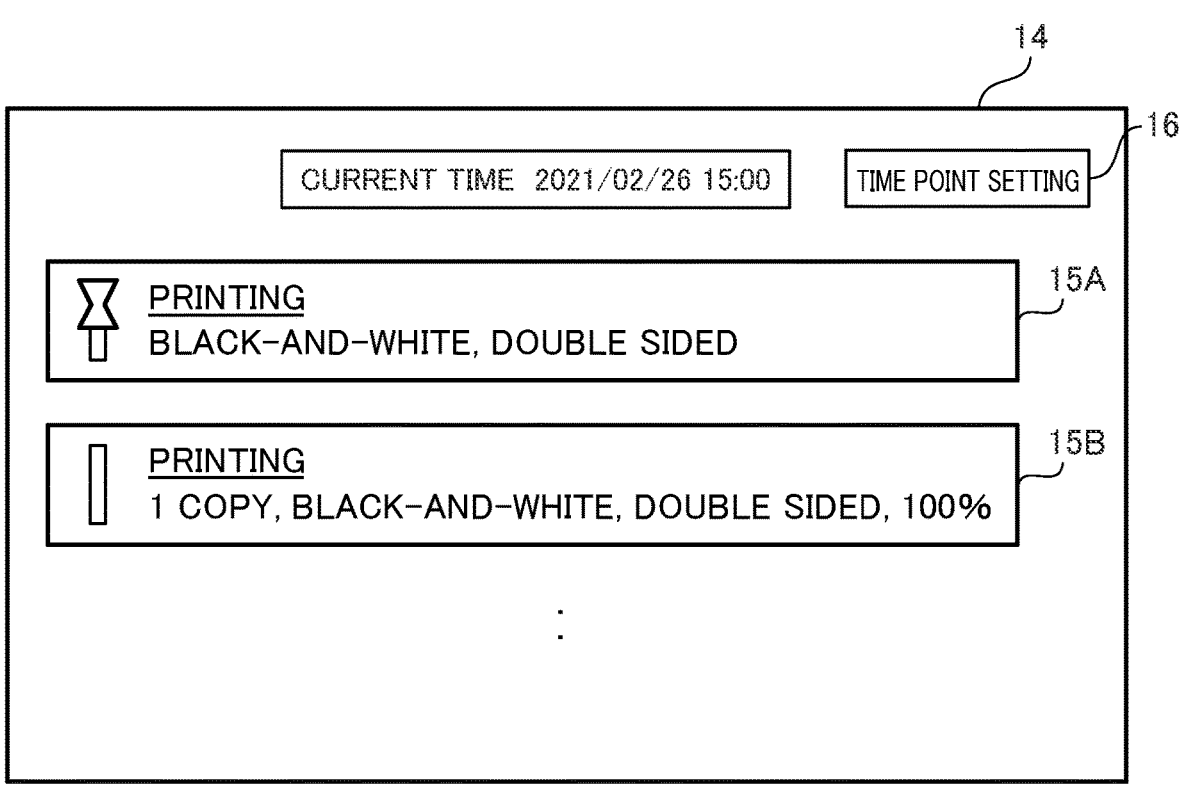
FIG. 4 is a diagram illustrating an example of a history screen on which an operator pinned on the display unit is displayed.

The remaining setting is a setting indicating whether or not to cause the operator 15 associated with the setting information to remain on the display unit 14. Note that the operator 15 set to remain is a so-called pinned operator 15A (hereinafter, it may be simply referred to as the operator 15A) on the history screen of the display unit 14. The operator 15A can determine and store a range of available users in units of users, units of affiliation, and the like. FIG. 4 illustrates an example of the history screen on which the operator 15A pinned on display unit 14 is displayed. In the example of the history screen illustrated in FIG. 4, the pinned operator 15A is displayed at a top with a pinning mark, and an unpinned operator 15B (hereinafter, it may be simply referred to as the operator 15B) is displayed below it. On the history screen of the display unit 14, the pinned operator 15A set to remain is caused to remain and be preferentially displayed. The unpinned operator 15B set not to remain is sequentially erased for a certain period or by accumulation of a certain number of items. By setting the remaining setting to remain, it is possible to set the operator not to be deleted when the number of operators 15 on the history screen reaches a specified number. Note that the remaining setting is changed according to an instruction from the user, and the operator 15A can be deleted. Furthermore, in a case in which a time point setting to be described later is set in the operator 15A, control may be performed such that the operator cannot be deleted in a case in which the remaining setting is set to remain, and the remaining setting can be changed to be set not to remain, that is, the operator can be deleted after being changed to the operator 15B.

Note that the pinned operator 15A can be displayed not only on the history screen but also on various other screens. The following setting of the time point information is based on the premise that processing is performed on the pinned operator 15A. Furthermore, the operation of enabling the pinned operator 15A and the unpinned operator 15B to execute a job or make a job executable when selected is similar.

The time point information is information for determining the available time of the operator 15A, and in the present embodiment, it is assumed that either a period designation or a switching date and time can be set. In the period designation, at least one of a start date and time and an end date and time as a period that can be used by the operator 15A can be set. Both the start date and time and the end date and time may be set, or only the start date and time and only the end date and time may be set. The switching date and time is a date and time when the setting information is switched for the operator 15A. The switching date and time is set together with the setting information in a case where first setting information and second setting information different from the first setting information are set in association with each other. The setting information reflected in the job by selecting the operator 15A is changed from the first setting information to the second setting information at the switching date and time. In the example of the information storage unit 23B of FIG. 2, the first line shows a state in which the start date and time and the end date and time of the period designation are set in the operator 15A. The second line shows a state in which only the start date and time (no end date and time) of the period designation is set in the operator 15A. The third line shows a state in which the switching date and time is set in the operator 15A. Note that even in a case where the switching date and time is set, a period may be allowed to be designated. In this case, the start date and time may be set before the switching date and time, and the end date and time may be set later according to the switching date and time.

Figure 5:
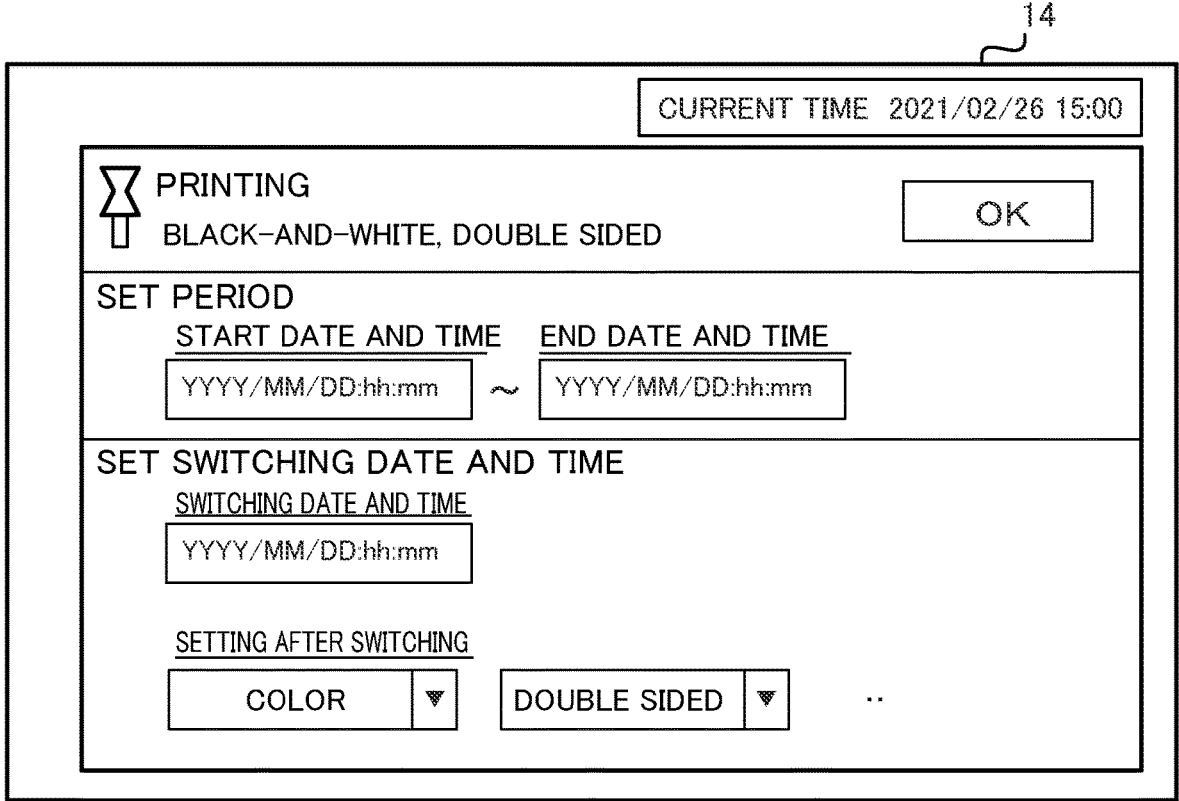
FIG. 5 is a diagram illustrating an example of a setting screen of time point information.

In the present embodiment, when the user performs a predetermined operation from the display unit 14, the CPU 21 sets the time point information in the operator 15A. For example, when the operator 15A is pressed for a long time or a time point setting button 16 is pressed to select the operator 15A, the screen shifts to a setting screen of the time point information. In addition, a conducting wire such as a sub-menu that can be shifted to the setting screen of the time point information may be provided. FIG. 5 illustrates an example of the setting screen of the time point information. As illustrated in FIG. 5, the start date and time, the end date and time, or the switching date and time can be input. As for the switching date and time, the setting after the switching can be selected by a pull-down menu, a pop-up menu, or the like (not illustrated). After the input, when an OK button is pressed, the time point information is associated with the operator 15A and stored in the information storage unit 23B.

Figure 6:
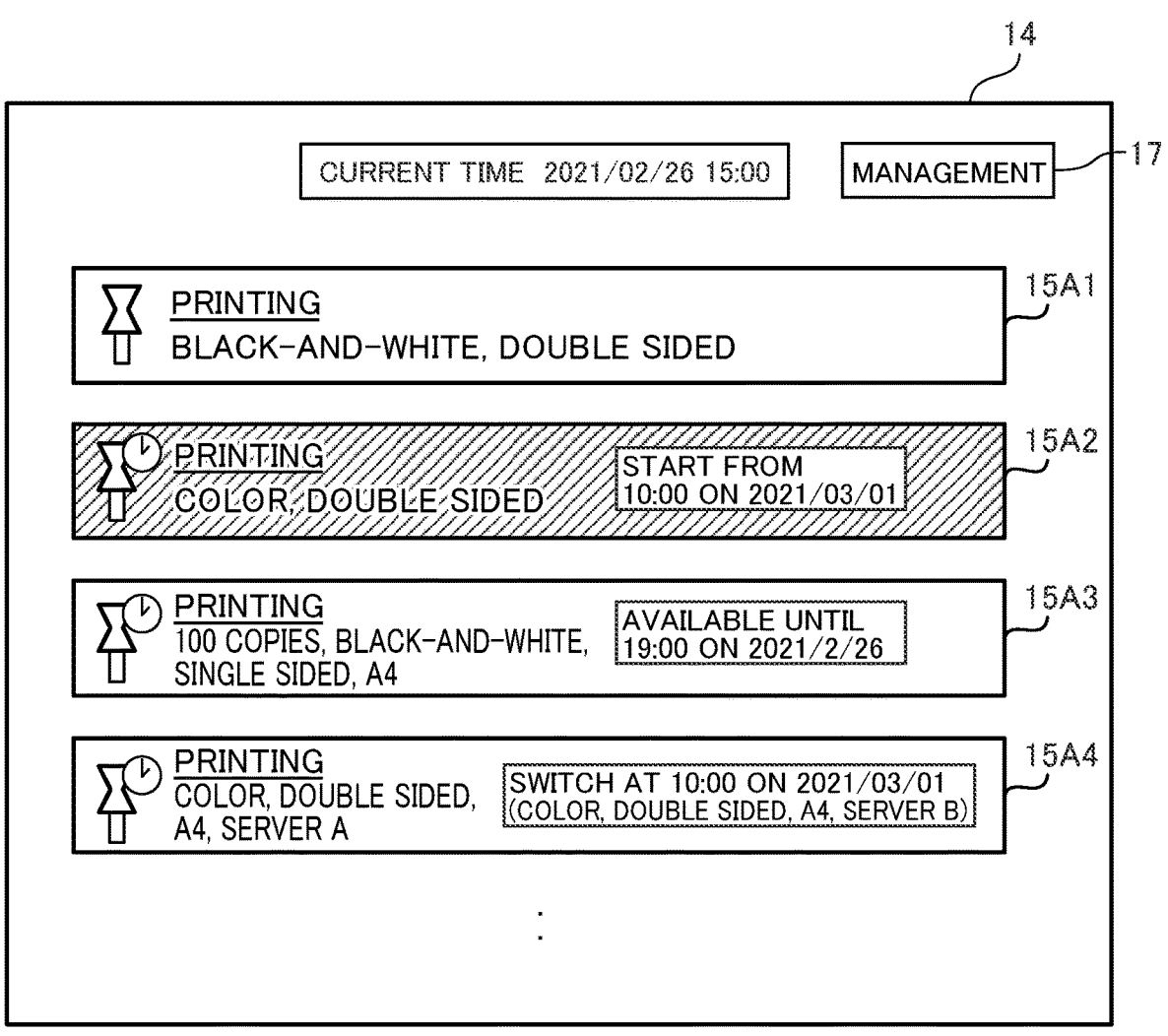
FIG. 6 is a diagram illustrating an example of a display mode of time point information related to an operator.

FIG. 6 is a diagram illustrating an example of a display mode of time point information related to an operator. The operator 15A after setting the time point information may cause the display unit 14 to display the time point information in an identifiable manner. In the example illustrated in FIG. 6, examples of an operator 15A1, an operator 15A2, an operator 15A3, and an operator 15A4 are illustrated. The operator 15A1 is an operator for which time point information is not set, and the operators 15A2 to 15A4 are examples of an operator for which time point information is set. As illustrated in FIG. 6, in a case where the time point information is set, the time point information may be displayed in a display mode different from that of the operator to which the time point information is not set, such as attaching a clock icon. The operator 15A2 is an operator in the unavailable time, and the operators 15A3 and 15A4 are operators in the available time. For example, even if the user selects the operator 15A2 in the unavailable time, an error sound or an error display is made, and the job cannot be executed. Furthermore, when the user selects the operator 15A3 or the operator 15A4 at the available time, the job can be executed reflecting the setting information associated with the operator.

The operator 15A2 is an operator in which a start date and time of the period designation is set. The display mode of the operator 15A2 displayed on the display unit 14 is before the start date and time, and indicates that the use of the operator according to the setting information can be started from "2021/03/01-10:00" which is the start date and time, and indicates an unselectable state until the start date and time. In this manner, the unavailable operator 15A2 is displayed together with the notice of the start date and time, and the operator 15A2 is made available after the start date and time. Furthermore, the background color is changed and displayed so as to indicate that it is out of the valid period and unavailable. Note that not only the background color but also a font, a character color, and the like may be made different for the operator 15A outside the valid period. Note that the number of days prior to which the notice of the start date and time is displayed may be determined in advance, and the notice may be set to be displayed from a setting time point of the start date and time.

The operator 15A3 is an operator in which an end date and time of the period designation is set. The display mode of the operator 15A3 displayed on the display unit 14 indicates an end notice in which the end date and time is set to "2021/02/26-19:00" and "available until 2021/02/26-19:00" so as to indicate the approach of the end date and time. The operator 15A3 is displayed in an available state until the end date and time, and is hidden at the end date and time. Note that the number of days before the end date and time when the advance notice is displayed may be determined in advance as the display mode indicating the approach, and the advance notice may be set to be displayed from a time point when the end date and time is set. In addition, a text or an icon indicating that operator 15A is an application with a time limit may be displayed.

The operator 15A4 is an operator to which a switching date and time is set. The display mode of the operator 15A4 displayed on display unit 14 indicates that the setting information is switched at "2021/03/01-10:00" which is the switching date and time to setting information displayed below the switching date and time. Here, a setting is made to switch a storage destination from the server A to the server B.

Note that, as illustrated in FIG. 6, in a case where the time point information is set in the operator 15A, a management button 17 is disposed in the management mode of the operator on the display unit 14, and the mode can be shifted to the management mode.

The management mode will be described. In the management mode, display is performed including the operator 15A that is not available, and in the management mode, in a case where the user is a creator of the operator 15A or an administrator of the information processing unit 20, contents that can be managed are made different from each other. In a case in which the user is the creator, the operator 15A created by the creator is displayed and made editable. In this case, the operator 15A created by another user is controlled not to be displayed. In a case in which the user is the administrator, the operator 15A created for all the users is displayed, and search and editing under predetermined conditions can be performed by a search UI 18 or the like. Note that the authority for each user who determines the creator or the administrator is assumed to be set in advance.

Figure 7:
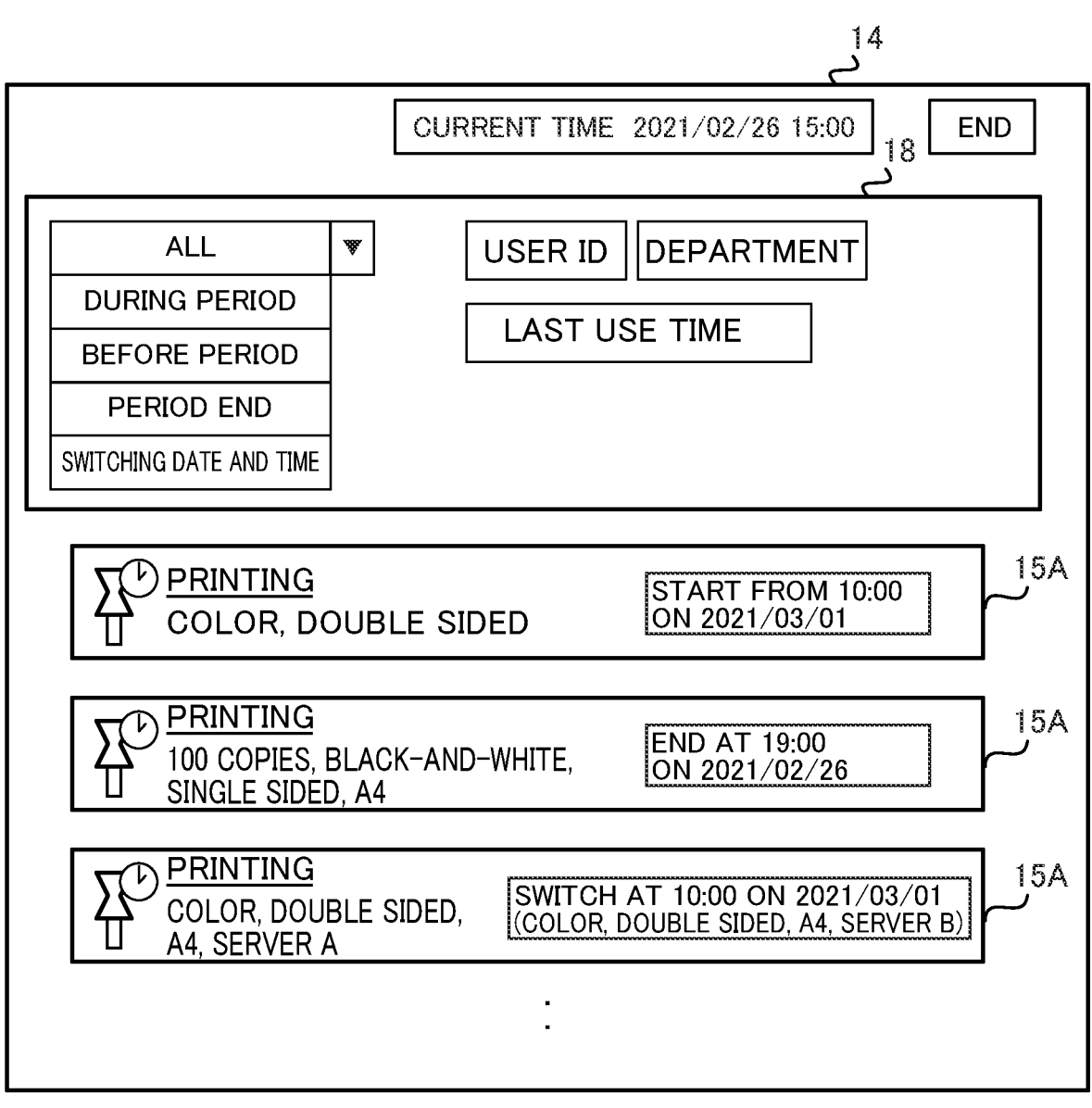
FIG. 7 is a diagram illustrating an example of a screen of a management mode in a case in which a user is an administrator.

FIG. 7 is a diagram illustrating an example of a management mode screen in a case in which the user is the administrator. As illustrated in FIG. 7, in the management mode, it is possible to narrow down before period, during period, period end, and switching date and time regarding the time point information by the search UI 18, and the screen transitions to the setting screen of the operator 15A by selecting from a list. Furthermore, the user information can be narrowed down by a user ID, a department, a last use time, and the like. The last use time is time when the operator was last used by the user. In the case of narrowing down by before the period, the operator 15A whose start date and time is earlier than the current time is narrowed down and displayed. In the case of narrowing down by during the period, the operator 15A in which the current time is on or after the start date and time and before the end date and time is narrowed down and displayed. In the case of narrowing down by the period end, the operator 15A in which a date and time before the current time is set as the end date and time is displayed. In the case of narrowing down by the switching date and time, the operator 15A in which the switching date and time is set is displayed. In this way, by enabling the operator 15A to be searched in the management mode, it is also possible to manage the operator 15A before the period or after the period that is not a display target. Furthermore, also in a case in which the user is in the management mode of the creator, narrowing search regarding the time point information may be performed.

Figure 8:
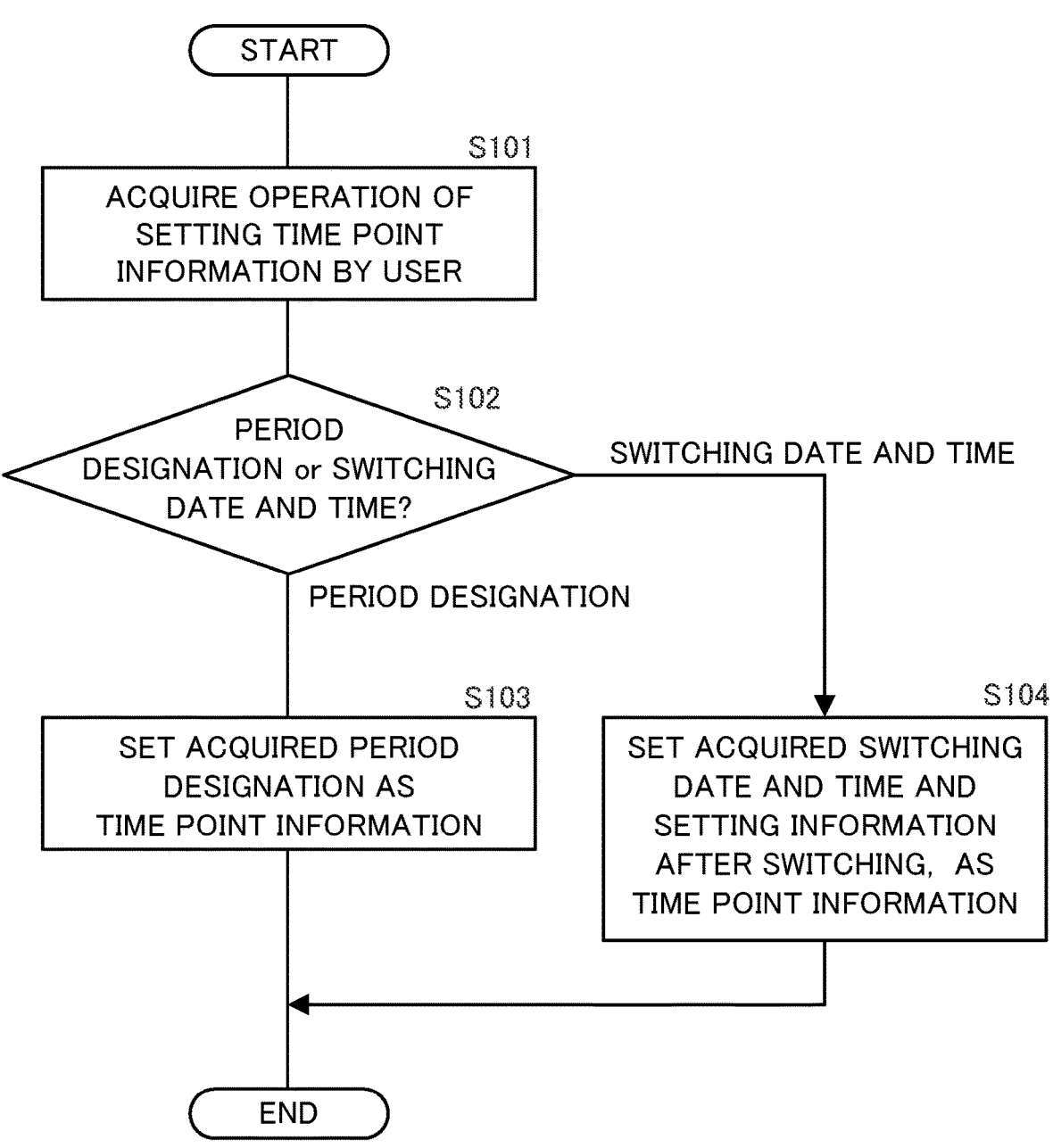
FIG. 8 is a flowchart illustrating a flow of time point information setting processing by an information processing unit.

Next, an operation of the information processing unit 20 will be described with reference to FIG. 8. FIG. 8 is a flowchart illustrating a flow of time point information setting processing by the information processing unit 20. The CPU 21 reads the information processing program from the storage unit 23, develops the information processing program in the memory 22, and executes the information processing program, whereby the time point information setting processing is performed. The time point information setting processing illustrated in FIG. 8 is performed in a case where the screen shifts to the setting screen of the time point information by the user's operation.

In step S101, the CPU 21 acquires an operation of setting the time point information by the user. In the setting operation, either the start date and time or the end date and time is input in the case of the period designation, and the switching date and time and the setting information after the switching are input in the case of the switching date and time.

In step S102, the CPU 21 determines whether the setting of the acquired time point information is the period designation or the switching date and time. In a case where it is determined that the period is designated, the processing proceeds to step S103, and in a case where it is determined that the date and time is switched, the processing proceeds to step S104.

In step S103, the CPU 21 sets the acquired period designation as the time point information in response to the pressing of the OK button by the user operation. The period designation is at least one of a start date and time and an end date and time.

In step S104, the CPU 21 sets the acquired switching date and time and the setting information after the switching as the time point information in response to the pressing of the OK button by the user operation. The above is the description of the flowchart of the time point information setting processing.

As described above, according to the present embodiment, it is possible to set the time when the setting information set in advance for the function is made available.

Furthermore, by performing the period designation, it is possible to perform setting reflecting the user's need to enable use of the pinned operator 15A in a case where a designated day such as a year comes. Furthermore, it is possible to perform setting reflecting a user's need to display the pinned operator 15A only during an application document submission period and hide it so as not to erroneously submit it outside the period.

Furthermore, by setting the switching date and time, it is possible to perform setting reflecting the user's need to automatically switch the pinned setting on the designated day. For example, it is also possible to support automatic switching of a storage destination after the switching date due to the reason of server replacement such as setting the pinned operator 15A to store scanned documents in the server A until September 30 and in the server B after October 1. Furthermore, it is also possible to cope with automatic switching of a FAX transmission destination after a transfer date due to the reason of the transfer of the company such as setting of the pinned operator 15A in which the FAX transmission destination phone number is changed after April 1.

Note that the present disclosure is not limited to the above-described embodiments, and various modifications and applications can be made without departing from the gist of the disclosure. For example, at the time of setting the time point information, the user may be allowed to set how many days before each of the designated start date and time, end date and time, and switching date and time an advance notice is to be displayed. As a result, it is possible to set the notice timing according to the user's needs.

Note that various processors other than the CPU may execute the time point information setting processing executed by the CPU reading the software (program) in the embodiment described above. Examples of the processor in this case include a programmable logic device (PLD) in which a circuit configuration can be changed after manufacturing a field-programmable gate array (FPGA) or the like, a dedicated electric circuit that is a processor having a circuit configuration exclusively designed for executing specific processing such as an application specific integrated circuit (ASIC), and the like. Furthermore, the time point information setting processing may be executed by one of these various processors, or may be executed by a combination of two or more processors of the same type or different types (for example, a plurality of FPGAs, a combination of a CPU and an FPGA, and the like). Furthermore, more specifically, the hardware structure of these various processors is an electric circuit in which circuit elements such as semiconductor elements are combined.

Furthermore, in the embodiment described above, the aspect in which the program of the time point information setting processing is stored (installed) in advance in the ROM or the storage has been described, but the present disclosure is not limited thereto. The program may be provided in a form recorded in a non-transitory recording medium such as a compact disk read only memory (CD-ROM), a digital versatile disk read only memory (DVD-ROM), and a universal serial bus (USB) memory. Furthermore, the program may be downloaded from an external device via a network.

Furthermore, the operation of the processor in the embodiment described above may be performed not only by one processor but also by a plurality of processors existing at physically separated positions in cooperation. Furthermore, the order of each operation of the processor is not limited to the order described in each of the above-described embodiments and may be changed, if appropriate.

The disclosure of Japanese Patent Application No. 2021-024529 filed on Feb. 18, 2021 is incorporated herein by reference in its entirety. All documents, patent applications, and technical standards described in this specification are incorporated herein by reference to the same extent as if each document, patent application, and technical standard were specifically and individually indicated to be incorporated by reference.

The invention claimed is:

1. An information processing device comprising:
a processor,
wherein the processor:
causes display, on a display unit, of an operator associated with setting information that can be reflected in a job that is an instruction to execute a function, the operator being set to remain on the display unit,
sets one or more pieces of time point information for determining an available time of the operator by an operation of a user, and
makes the job executable by reflecting the setting information associated with the operator when the user selects the operator in the available time;
wherein the operator is associated with first setting information and second setting information different from the first setting information, and
the processor sets a switching date and time as the time point information, and changes the setting information reflected in the job by selecting the operator from the first setting information to the second setting information at the switching date and time.

2. The information processing device according to claim 1, wherein the processor sets a start date and time as the time point information, and makes the operator available after the start date and time.

3. The information processing device according to claim 2, wherein the processor causes the display unit to display the operator, which is unavailable, for a predetermined period before the start date and time together with an advance notice of the start date and time.

4. The information processing device according to claim 1, wherein the processor sets an end date and time as the time point information, and causes the display unit to display the operator and makes the operator available, until the end date and time.

5. The information processing device according to claim 4, wherein the processor causes the display unit to display a display mode indicating approach of the end date and time, during a predetermined period before the end date and time.

6. The information processing device according to claim 1, wherein the processor causes the display unit to display the operator together with an advance notice of the switching date and time during a predetermined period before the switching date and time.

7. The information processing device according to claim 1, wherein the processor causes the operator for which the time point information has been set to be displayed in a display mode different from a display mode of the operator for which the time point information has not been set.

8. The information processing device according to claim 1, wherein, in a management mode that is switchable on the display unit according to an operation of the user, the processor causes the operator, including the operator that is not in the available time, to be displayed, and makes the setting information editable.

9. The information processing device according to claim 8, wherein:

in the management mode, in a case in which the user is a creator of the operator, the processor causes the operator created by the creator to be displayed, and in a case in which the user is an administrator, the processor displays operators created for all users, and enables search under a predetermined condition.

10. A non-transitory computer-readable storage medium storing an information processing program executable by a computer to perform processing comprising:

displaying, on a display unit, an operator associated with setting information that can be reflected in a job that is an instruction to execute a function, the operator being set to remain on the display unit;

setting one or more pieces of time point information for determining an available time of the operator by an operation of a user, and making the job executable by reflecting the setting information associated with the operator when the user selects the operator in the available time;

wherein the operator is associated with first setting information and second setting information different from the first setting information, and the computer sets a switching date and time as the time point information, and changes the setting information reflected in the job by selecting the operator from the first setting information to the second setting information at the switching date and time.

\* \* \* \* \*